(12) United States Patent
Min et al.

(10) Patent No.: US 11,423,655 B2
(45) Date of Patent: Aug. 23, 2022

(54) SELF-SUPERVISED SEQUENTIAL VARIATIONAL AUTOENCODER FOR DISENTANGLED DATA GENERATION

(71) Applicant: NEC Laboratories America, Inc., Princeton, NJ (US)

(72) Inventors: Renqiang Min, Princeton, NJ (US); Yizhe Zhu, Piscataway, NJ (US); Asim Kadav, Mountain View, CA (US); Hans Peter Graf, South Amboy, NJ (US)

(73) Assignee: NEC Corporation

( * ) Notice: Subject to any disclaimer, the term of this patent is extended or adjusted under 35 U.S.C. 154(b) by 135 days.

(21) Appl. No.: 17/088,043

(22) Filed: Nov. 3, 2020

(65) Prior Publication Data
US 2021/0142120 A1  May 13, 2021

Related U.S. Application Data

(60) Provisional application No. 62/934,609, filed on Nov. 13, 2019.

(51) Int. Cl.
*G06V 20/40* (2022.01)
*G06K 9/62* (2022.01)

(52) U.S. Cl.
CPC .......... *G06V 20/46* (2022.01); *G06K 9/6223* (2013.01); *G06K 9/6256* (2013.01); *G06K 9/6264* (2013.01); *G06V 20/41* (2022.01)

(58) Field of Classification Search
CPC .. G06K 9/6223; G06K 9/6256; G06K 9/6264; G06V 20/46; G06V 20/41
See application file for complete search history.

(56) References Cited

PUBLICATIONS

Feng et al., "Improving Unsupervised Subword Modeling via Disentangled Speech Representation Learning and Transformation" (published in INTERSPEECH, Jul. 2019) (Year: 2019).*
Balaji et al., "Conditional GAN with Discriminative Filter Generation for Text-to-Video Synthesis", Proceedings of the Twenty-Eighth International Joint Conference on Artificial Intelligence (IJCAI-19), Aug. 2019, pp. 1995-2001.
Bayer et al., "Learning Stochastic Recurrent Networks", arXiv:1411.7610v3 [stat.ML] Mar. 5, 2015, pp. 1-9.
Chen et al., "Isolating Sources of Disentanglement in VAEs", arXiv:1802.04942v5 [cs.LG] Apr. 23, 2019, pp. 1-29.
Chung et al.,A Recurrent Latent Variable Model for Sequential Data, arXiv:1506.02216v6 [cs.LG] Apr. 6, 2016, pp. 1-9.

(Continued)

*Primary Examiner* — Casey L Kretzer
(74) *Attorney, Agent, or Firm* — Joseph Kolodka

(57) ABSTRACT

A computer-implemented method is provided for disentangled data generation. The method includes accessing, by a variational autoencoder, a plurality of supervision signals. The method further includes accessing, by the variational autoencoder, a plurality of auxiliary tasks that utilize the supervision signals as reward signals to learn a disentangled representation. The method also includes training the variational autoencoder to disentangle a sequential data input into a time-invariant factor and a time-varying factor using a self-supervised training approach which is based on outputs of the auxiliary tasks obtained by using the supervision signals to accomplish the plurality of auxiliary tasks.

20 Claims, 6 Drawing Sheets

(56) References Cited

PUBLICATIONS

Denton et al., "Unsupervised Learning of Disentangled Representations from Video", 31st Conference on Neural Information Processing Systems (NIPS 2017), Dec. 2017, pp. 1-10.
Denton et al., "Stochastic Video Generation with a Learned Prior", Proceedings of the 35 th International Conference on Machine Learning, PMLR 80, 2018, Jul. 2018, 10 pages.
Li et al., "Disentangled Sequential Autoencoder", ComarXiv:1803.02991v2 [cs.LG] Jun. 12, 2018, 12 pages.
Locatello et al., Challenging Common Assumptions in the Unsupervised Learning of Disentangled Representations, arXiv:1811.12359v4 [cs LG] Jun. 18, 2019, 37 pages.
Misra et al., "Shuffle and Learn: Unsupervised Learning using Temporal Order Verification", arXiv:1603.08561v2 [cs.CV] Jul. 26, 2016, pp. 1-21.
Noroozi et al., "Unsupervised Learning of Visual Representations by Solving Jigsaw Puzzles", arXiv:1603.09246v3 [cs.CV] Aug. 22, 2017, pp. 1-19.
Siarohin et al., "Animating Arbitrary Objects via Deep Motion Transfer", arXiv:1812.08861v3 [cs.GR] Aug. 30, 2019, pp. 1-21.
Wang et al., "Unsupervised Learning of Visual Representations using Videos", arXiv:1505.00687v2 [cs.CV] Oct. 6, 2015, pp. 1-9.
Hsu et al., "Unsupervised Learning of Disentangled and Interpretable Representations from Sequential Data", 31st Conference on Neural Information Processing Systems (NIPS 2017), Dec. 2017, pp. 1-12.
Ilg et al., "FlowNet 2.0: Evolution of Optical Flow Estimation with Deep Networks", arXiv:1612.01925v1 [cs.CV] Dec. 6, 2016, pp. 1-16.
Jing et al., "Self-supervised Visual Feature Learning with Deep Neural Networks: A Survey", arXiv:1902.06162v1 [cs.CV] Feb. 16, 2019, pp. 1-24.
Larsson et al., "Colorization as a Proxy Task for Visual Understanding", arXiv:1703.04044v3 [cs.CV] Aug. 13, 2017, pp. 1-10.
Wang et al., "Self-supervised Spatio-temporal Representation Learning for Videos by Predicting Motion and Appearance Statistics", ararXiv: 1904.03597v1 [cs.CV] Apr. 7, 2019, pp. 1-10.

\* cited by examiner

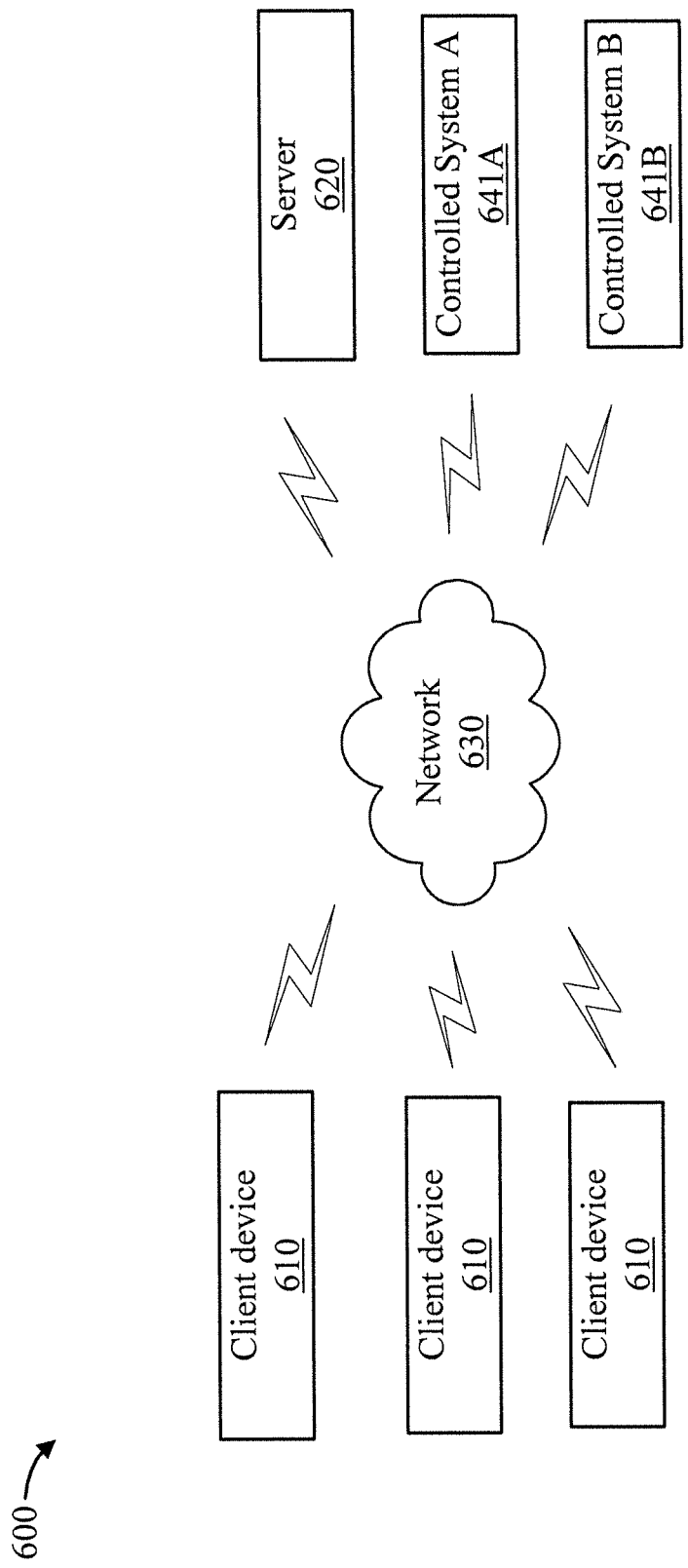

SELF-SUPERVISED SEQUENTIAL VARIATIONAL AUTOENCODER FOR DISENTANGLED DATA GENERATION

RELATED APPLICATION INFORMATION

This application claims priority to U.S. Provisional Patent Application No. 62/934,609, filed on Nov. 13, 2019, incorporated herein by reference entirety.

BACKGROUND

Technical Field

The present invention relates to artificial intelligence and more particularly to a self-supervised sequential variational autoencoder for disentangled data generation.

Description of the Related Art

Representation learning is one of the essential research problems in machine learning. The sensory data in the real world, such as video, image, and audio, are usually in the form of high dimensions. Representation learning aims to map these data into a low-dimension space to make it easier to extract useful information for downstream tasks such as classification and detection. Recent years witness a rising interest in disentangled representations, which separates the underlying factors of observed data variation such that each factor exclusively interprets one semantic attributes of sensory data. For instance, a desirable disentanglement of artistic images can separate the style and content information. The representation of sequential data is expected to be disentangled as time-varying factors and time-invariant factors. For video data, the identity of the object is regarded as a time-invariant factor, and the motion in each frame is considered as time-varying factors. In speech data, the representations of the identity of the speaker and the linguist content are expected to be disentangled. There are several benefits of disentangled representation. First, the learned models that produce disentangled representations are more explainable. Second, the disentangled representations make it easier and more efficient to manipulate data generation.

SUMMARY

According to aspects of the present invention, a computer-implemented method is provided for disentangled data generation. The method includes accessing, by a variational autoencoder, a plurality of supervision signals. The method further includes accessing, by the variational autoencoder, a plurality of auxiliary tasks that utilize the supervision signals as reward signals to learn a disentangled representation. The method also includes training the variational autoencoder to disentangle a sequential data input into a time-invariant factor and a time-varying factor using a self-supervised training approach which is based on outputs of the auxiliary tasks obtained by using the supervision signals to accomplish the plurality of auxiliary tasks.

According to other aspects of the present invention, a computer program product is provided for disentangled data generation. The computer program product includes a non-transitory computer readable storage medium having program instructions embodied therewith. The program instructions are executable by a computer to cause the computer to perform a method. The method includes accessing, by a variational autoencoder of the computer, a plurality of supervision signals. The method further includes accessing, by the variational autoencoder, a plurality of auxiliary tasks that utilize the supervision signals as reward signals to learn a disentangled representation, The method also includes training the variational autoencoder to disentangle a sequential data input into a time-invariant factor and a time-varying factor using a self-supervised training approach which is based on outputs of the auxiliary tasks obtained by using the supervision signals to accomplish the plurality of auxiliary tasks.

According to yet other aspects of the present invention, a computer processing system is provided or disentangled data generation. The computer processing system includes a memory device for storing program code. The computer processing system further includes a processor device operatively coupled to the memory device for running the program code to access, using a variational autoencoder, a plurality of supervision signals. The processor device further runs the program code to access, using the variational autoencoder, a plurality of auxiliary tasks that utilize the supervision signals as reward signals to learn a disentangled representation. The processor device also runs the program code to train the variational autoencoder to disentangle a sequential data input into a time-invariant factor and a time-varying factor using a self-supervised training approach which is based on outputs of the auxiliary tasks obtained by using the supervision signals to accomplish the plurality of auxiliary tasks.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 is a block diagram showing an exemplary computing environment, in accordance with an embodiment of the present invention.

DETAILED DESCRIPTION OF PREFERRED EMBODIMENTS

Embodiments of the present invention are directed to self-supervised sequential variational autoencoder for disentangled data generation.

In accordance with one or more embodiments of the present invention, representation disentanglement is implemented by exploring auxiliary supervisory signals which can be readily obtained from both data and off-the-shelf methods. The representation of sequential data is usually encouraged to be disentangled to the time-invariant factor and time-varying factor. The former encodes the static information such as the appearance of objects in video data or the timbre of the speaker in audio data, while the latter encodes the corresponding dynamic information such as the motion of objects and the linguistic content spoken by the speaker. To this end, different labels are exploited that are freely available besides or within data and a series of auxiliary tasks are designed to use these labels as intrinsic reward signals to learn disentangled representation. Specifically, on the one hand, the temporal order of the sequential data is exploited and the time-invariant factor of the temporally shuffled data is expected to be the same as that of the original data. On the other hand, the time-varying factor is expected to include dynamic information in a different modality. Thus, embodiments of the present invention can predict the location of the largest motion in every frame of the video, which can be readily inferred from optical flow, or the volume in every segment of the audio. To further encourage the representation disentanglement, the mutual information between static and dynamic variables are introduced as an extra regularization.

Various exemplary applications to which embodiments of the present invention can be applied include but are not limited to, for example, generating new videos such as educational videos and entertainment videos with style transfer and generating new training audios with the speaker identity replaced to protect a customer's/user's privacy. Moreover, applications of disentangled sequential representation learning can further include understanding (interpretability), data generation/data augmentation (fairness, robustness, generalization), domain adaptation (domain variant (content) and domain invariant (motion)), and privacy (reducing the leakage of identity sensitive information: data sensing for self-driving cars, entertainment videos, educational videos, speaker identity).

Figure 1:
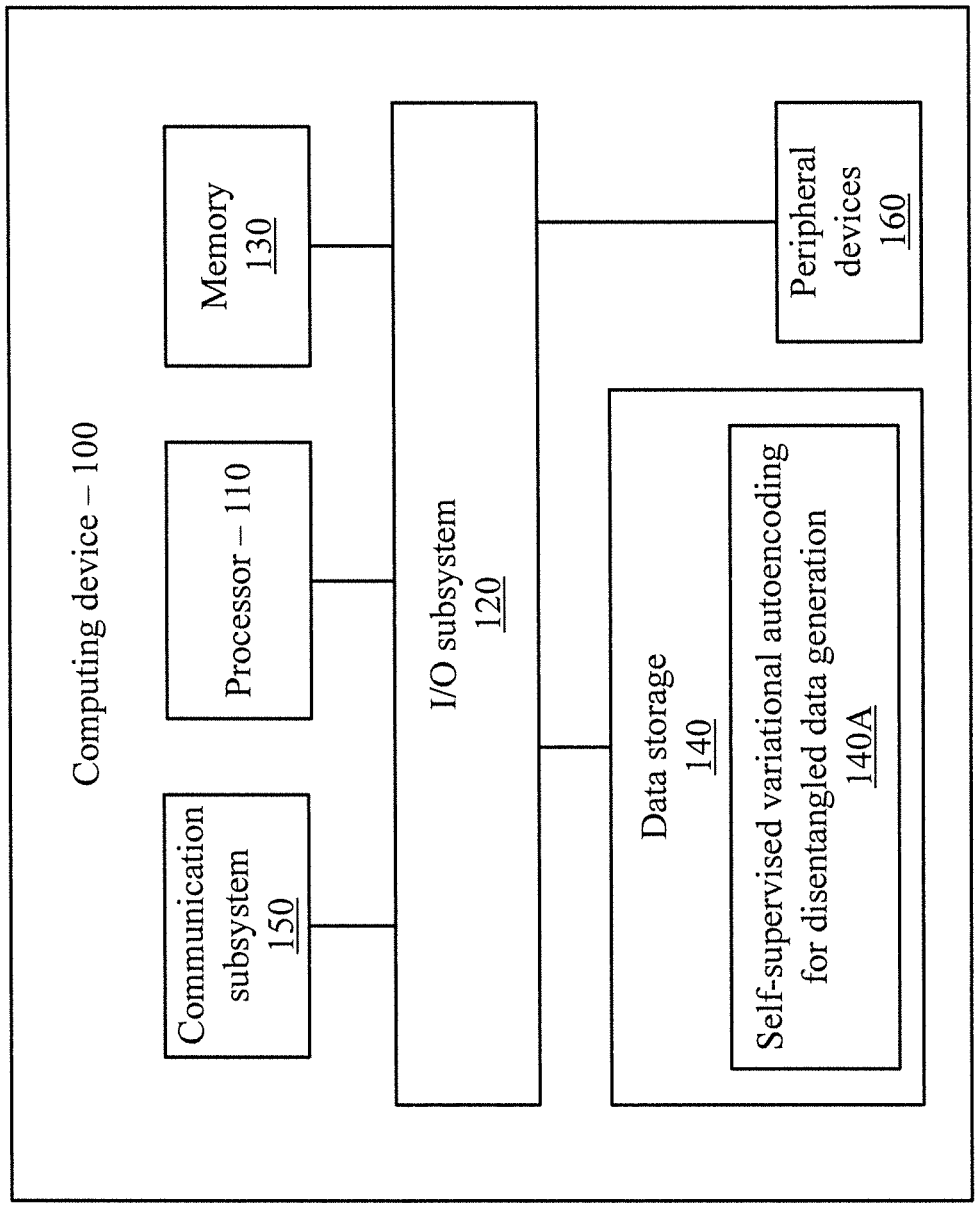
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform self-supervised sequential variational autoencoding for disentangled data generation.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for self-supervised variational autoencoding for disentangled data generation. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
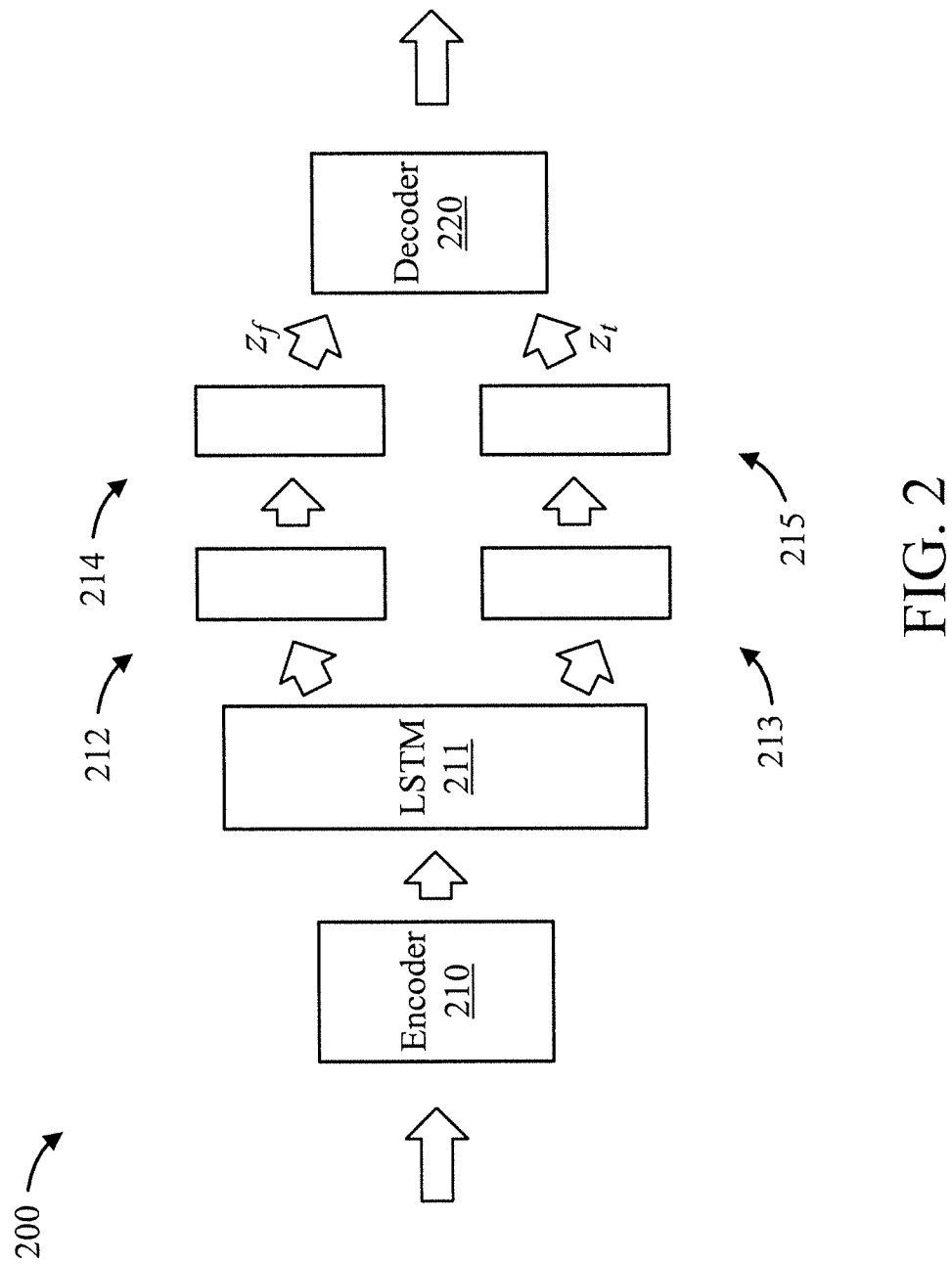
FIG. 2 is a diagram showing an exemplary self-supervision and regularization pipeline, in accordance with an embodiment of the present invention.

These and other variations of a hardware processor subsystem are also contemplated in accordance with embodiments of the present invention FIG. 2 is a diagram showing an exemplary self-supervision and regularization pipeline 200, in accordance with an embodiment of the present invention.

Self-supervision and regularization pipeline 200 enforces the latent variable of a sequential VAE (having an encoder 210, a LSTM 211, a dynamic latent manifold 212, a static latent space 213, samples 214 and 215, and a decoder 220) to be disentangled to a static representation $z_f$ and a dynamic representation $z_t$.

This figure is described in further detail hereinbelow.

Figure 3:
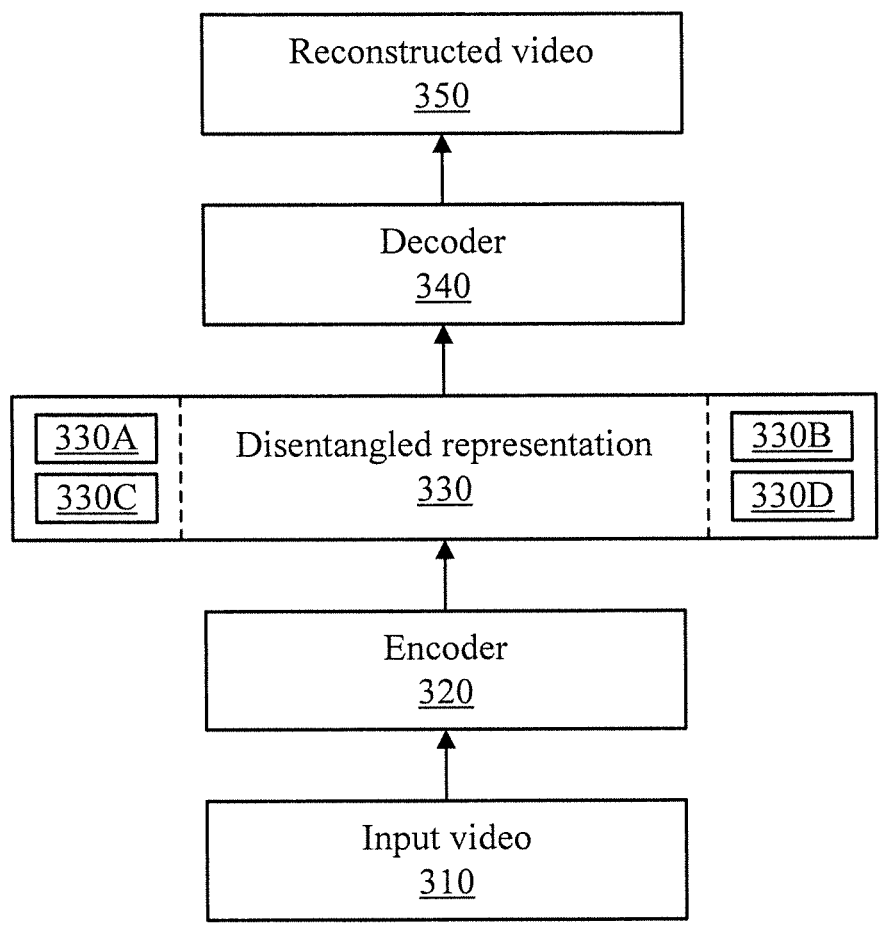
FIG. 3 is a block diagram showing an exemplary architecture, in accordance with an embodiment of the present invention.

FIG. 3 is a block diagram showing an exemplary architecture 300, in accordance with an embodiment of the present invention.

The architecture 300 includes an input video 310, an encoder 320, a disentangled representation 330, a decoder 340, and reconstructed video 350.

The disentangled representation 330 includes content with self-supervised regularization 330A and motion with self-supervised regularization.

The input video 310 is provided to the encoder 320.

The encoder 320 encodes a disentangled representation 330 that includes content with self-supervised regularization 330A and motion with self-supervised regularization 330B. The disentangled representation can further include an object identify 330C or a speaker identity 330D, in the case of video or audio sequential data inputs.

The decoder decodes the disentangled representation 330 to provide the reconstructed video 350.

Figure 4:
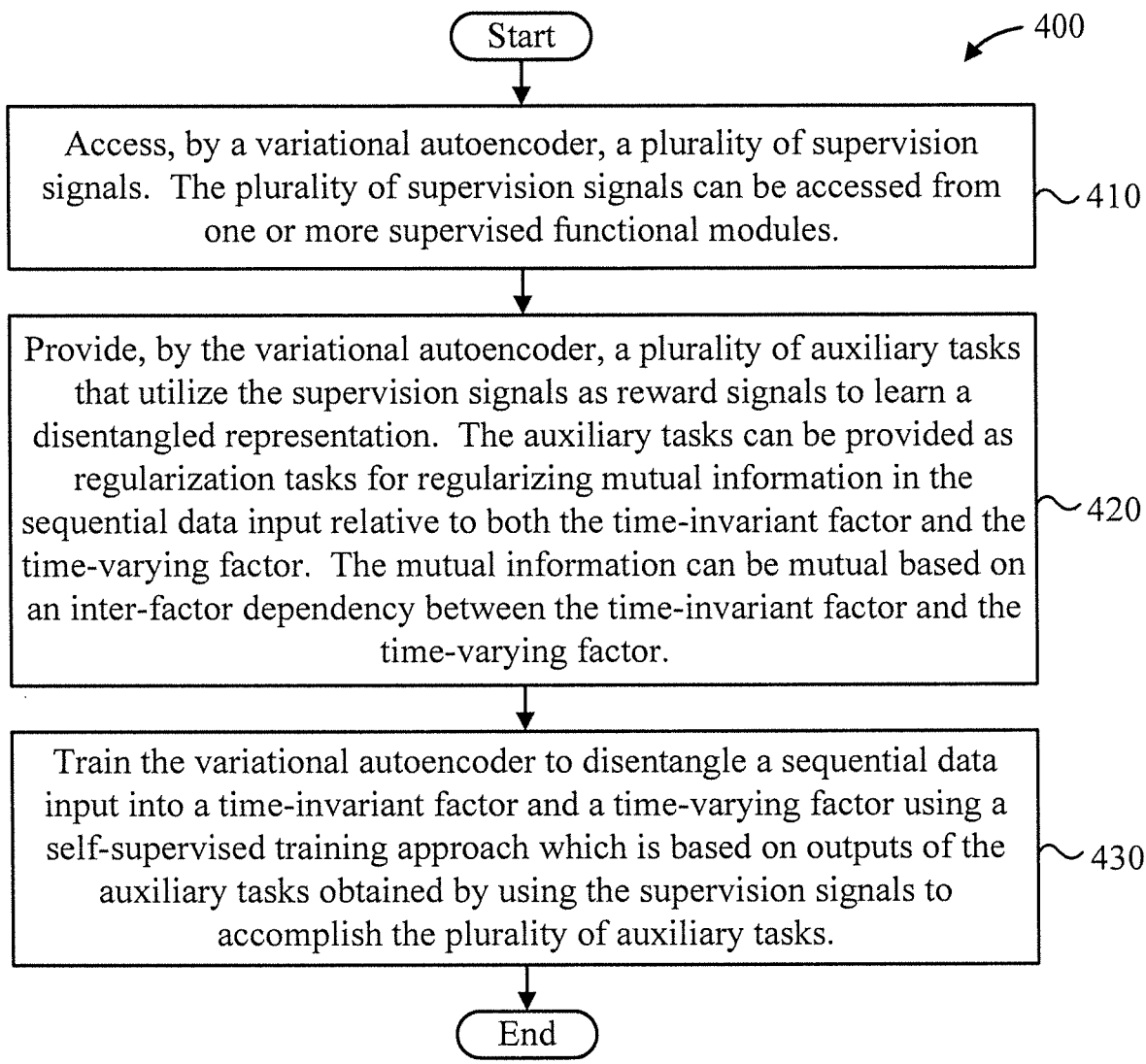
FIG. 4 is a flow diagram showing an exemplary method for disentangled data generation, in accordance with an embodiment of the present invention.

FIG. 4 is a flow diagram showing an exemplary method 400 for disentangled data generation, in accordance with an embodiment of the present invention.

At block 410, access, by a variational autoencoder, a plurality of supervision signals. In an embodiment, the plurality of supervision signals can be accessed from simple data manipulations and/or one or more existing supervised functional modules. For e.g., for manipulating video data, randomly shuffling video frames creates new video data with positive labels of preserving video content but negative labels of preserving video motion. A supervised functional module is an off-the-shelf classifier or predictor trained using other datasets, for e.g., a landmark detector for face data, a pre-trained ImageNet image classifier, an optical flow predictor, etc.

At block 420, provide, by the variational autoencoder, a plurality of auxiliary tasks that utilize the supervision signals as reward signals to learn a disentangled representation. In an embodiment, the auxiliary tasks can be provided as regularization tasks for regularizing mutual information in the sequential data input relative to both the time-invariant factor and the time-varying factor. In an embodiment, the mutual information can be mutual based on an inter-factor dependency between the time-invariant factor and the time-varying factor.

At block 430, train the variational autoencoder to disentangle a sequential data input into a time-invariant factor and a time-varying factor using a self-supervised training approach which is based on outputs of the auxiliary tasks obtained by using the supervision signals to accomplish the plurality of auxiliary tasks.

In an embodiment, the sequential data input includes video data having a plurality of frames, and the time-invariant factor is an identity of an object in the video data and the time-varying factor is a motion in each of the plurality of frames.

In an embodiment, the sequential data input includes video data, and the supervision labels of the auxiliary task for regularizing the time-varying factor is provided by: obtaining an optic flow map of the video data; forming patches by applying a grid to the optical flow map; computing an motion magnitude average for each of the patches; and generating supervision signals from indices of the patches with a top-k largest values.

In an embodiment, the sequential data input includes video data having a plurality of frames, and the method can further include detecting a landmark in each of the plurality of frames as a supervision for the time-varying factor.

In an embodiment, the sequential data input includes audio data, and the time-invariant factor is an identify of a speaker and the time-varying factor is a linguistic content of the audio data.

In an embodiment, the sequential data input includes audio data having a plurality of audio segments, and the supervision labels of the auxiliary task for regularizing the time-varying factor is provided by setting a magnitude threshold on a volume of each of the plurality of audio segments to obtain audio pseudo ground truths.

In an embodiment, the mutual information is minimized to encourage mutually exclusivity of the time-invariant factor with respect to the time-varying factor.

Figure 5:
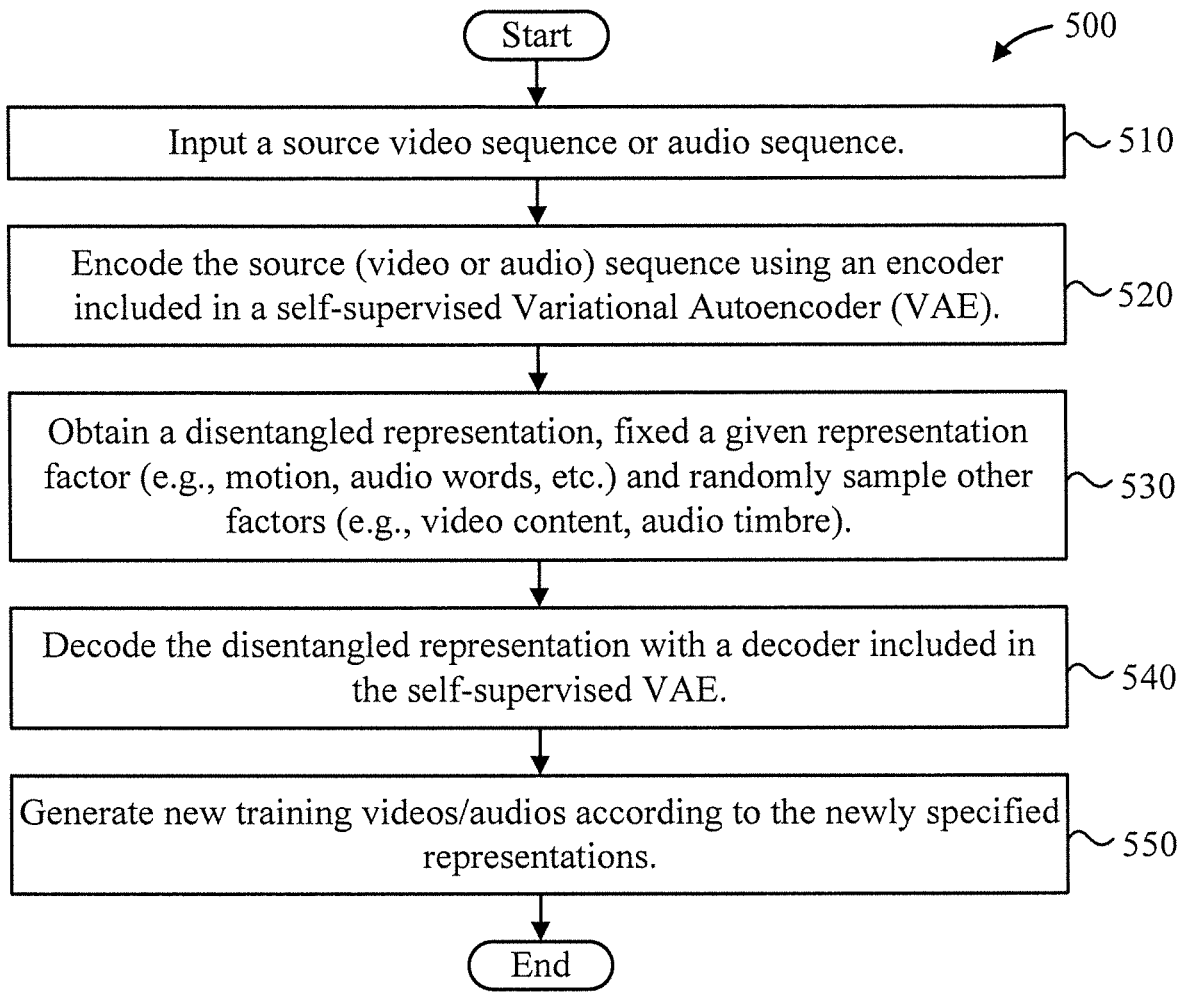
FIG. 5 is a block diagram showing an exemplary method for new media generation, in accordance with an embodiment of the present invention.

FIG. 5 is a block diagram showing an exemplary method 500 for new media generation, in accordance with an embodiment of the present invention.

At block 510, input a source video sequence or audio sequence.

At block 520, encode the source (video or audio) sequence using an encoder in a self-supervised Variational Autoencoder (VAE).

At block 530, obtain a disentangled representation, fixed a given representation factor (e.g., motion, audio words, etc.) and randomly sample other factors (e.g., video content, audio timbre).

At block 540, decode the disentangled representation with a decoder included in the self-supervised VAE.

At block 550, generate new training videos/audios according to the newly specified representations. In an embodiment, the fixed representation factor (e.g., motion factor, audio word factor, etc.) can be concatenated with the sampled factor (e.g., sampled video content factor, sampled audio timbre factor) to form a new latent representation vector, and pass it to a decoder in the self-supervised VAE to generate new videos/audios.

FIG. 6 is a block diagram showing an exemplary computing environment 600, in accordance with an embodiment of the present invention.

The environment 600 includes a server 610, multiple client devices (collectively denoted by the figure reference numeral) 620, a controlled system A 641, a controlled system B 642.

Communication between the entities of environment 600 can be performed over one or more networks 630. For the sake of illustration, a wireless network 630 is shown. In other embodiments, any of wired, wireless, and/or a combination thereof can be used to facilitate communication between the entities.

The server 610 receives sequential data inputs from client devices 620. The server 610 may control one of the systems 641 and/or 642 based on a prediction generated from a disentanglement model stored on the server 610. In an embodiment, the sequential data inputs can relate to time series data that, in turn, relates to the controlled systems 641 and/or 642 such as, for example, but not limited to sensor data. Control can relate to turning an impending failing element off, swapping out a failed component for another operating component, switching to a secure network, and so forth.

Some notations and the problem definition will now be described. $D=\{X^i\}^M$ are given as a dataset that include M i.i.d. sequences, where $Z \equiv X_{1:T} = (x_1, x_2, \ldots, X_T)$ denote a sequence of T observed variables, such as a video of T frames or an audio of T segments. Sequential variational encoder models are adopted here. Presume the sequence is generated from latent variable z. The latent variable z is factorized into two disentangled factors: a time-invariant variable $z_f$ and the time-varying factor $z_{1:T}$.

Priors: The prior of $z_f$ is defined as a standard Gaussian distribution: $z_f \sim \mathcal{N}(0,1)$. The time-varying latent variable $z_{1:T}$ follows a recurrent prior as follows:

$$z_t|z_{<t} \sim \mathcal{N}(\mu_t, \text{diag}(\sigma_t^2)), \quad (1)$$

where $[\mu_t, \sigma_t] = \emptyset_R^{prior}(z_{<t})$, $\mu_t, \sigma_t$ are the parameters of the prior distribution conditioned on all previous time-varying latent variable. The model $\emptyset_R^{prior}$ can be parameterized as a recurrent network, such as LSTM or GRU, where the hidden state is updated temporarily. The prior can be factorized as:

$$p(z)=p(z_f)p(z_{1:T})=p(z_f)\Pi_{t=1}^T p(z_t|z_{<t}) \quad (2)$$

Generation: The generating distribution of time step t is conditioned on $z_f$ and $z_t$.

$$x_t|z_f, z_t \sim \mathcal{N}(\mu_{x,t}, \text{diag}(\sigma_{x,t}^2)) \quad (3)$$

where $[\mu_{x,t}, \sigma_{x,t}] = \emptyset^{Decoder}$ can be a highly flexible function such as neural networks. The complete generative model can be formalized by factorization:

$$p(x_{1:T}, z_{1:T}, z_f)=p(z_f)\Pi_{t=1}^T p(x_t|z_f, z_t)p(z_t|z_{<t}) \quad (4)$$

Inference: The sequential VAE in accordance with the present invention uses variational inference to learn an approximate posterior $q(z_f|x_{1:T})$ and $q(z_t|x_{\leq t})$:

$$z_f \sim \mathcal{N}(\mu_f, \text{diag}(\sigma_f^2)), z_t \sim \mathcal{N}(\mu_t, \text{diag}(\sigma_t^2)), \quad (5)$$

where $[\mu_f, \sigma_f]=\psi_f^{Encoder}(x_{1:T})$ and $[\mu_t, \sigma_t]=\psi_R^{Encoder}(x_{\leq t})$.

The inference model in accordance with the present invention is factorized as $$q(z_{1:T}, z_f|x_{1:T})=q(z_f|x_{1:T})\Pi_{t=1}^T q(z_t|x_{\leq t}) \quad (6)$$

Learning: The objective function of sequential VAE is a timestep-wise negative variational lower bound:

$$\mathcal{L}_{VAE} = \mathbb{E}_{q(z_{1:T}, z_f|x_{1:T})}\left[-\sum_{t=1}^T \log p(x_t|z_f, z_t)\right] + \quad (7)$$

$$KL(q(z_f|x_{1:T})\|p(z_f)) + \sum_{t=1}^T KL(q(z_t|x_{\leq t})\|p(z_t|z_{<t}))$$

Note that the model in accordance with the present invention is different from conventional variational recurrent autoencoder which fails in considering the latent representation disentanglement. Besides, DSVAE assumes the variational posterior of $z_{1:T}$ depends on $z_f$, and thus it first infers $z_f$ and then samples $z_t$ conditioned on $z_f$, which implies the variables are still implicitly entangled. In contrast, $z_f$ and $z_t$ are inferred totally independently to enforce the representation disentanglement, resulting in a more efficient and concise model.

FIG. 2: The framework of the proposed model in the context of video data. Each frame of the video $x_{1:T}$ is fed into the encoder 210 to produce a sequence of the visual features, which is then passed through the LSTM 211 to obtain the manifold posterior of the dynamic latent variable $\{q(z_t|x_{\leq t})\}_{t=1}^T$ 212 and the posterior of the static latent variable $q(z_f|x_{1:T})$ 213. The static and dynamic representations $z_f$ and $z_{1:T}$ are sampled 214, 215 from the corresponding posteriors and concatenated to be fed into the decoder 220 to generate reconstructed sequence $x_{1:T}$. Three regularizors are imposed on dynamic and static latent variables to encourage the representation disentanglement.

Self-Supervised Learning Regularization with Auxiliary Tasks: Without any supervision, there is no guarantee that the time-invariant representation $z_f$ and the time-varying representation $z_t$ are disentangled. Here, a series of auxiliary tasks are introduced on the different types of representation as the regularization of the sequential VAE to achieve the disentanglement.

To encourage the time-invariant representation $z_f$ to exclude any dynamic information, it is expected that $z_f$ changes little when dynamic information dramatically varies. To this end, the temporal order of video frames is shuffled to form a shuffled video. Ideally, the static factors of the original video and shuffled video should be equal or very close to each. However, directly minimizing the distance of these two static factors will lead to very trivial solutions, e.g., the static factors of all video converge to the same value and contain any meaningful information. Thus, another video is involved to provide the negative sample of static factors. With a triple of static factors, a triplet loss is introduced as follows:

$$\mathcal{L}_{SCC}(z_f) = \max(D(z_f, z_f^{pos}) - D(z_f, z_f^{neg}) + m, 0) \quad (8)$$

where $z_f$, $z_f^{pos}$ and $z_f^{neg}$ are the static factors of the anchor video, the shuffled video as positive data, and another video as the negative data, $D(\bullet,\bullet)$ denotes the Euclidean distance and m is the margin. This triplet objective makes static factors to preserve meaningful static information to a certain degree while to exclude time-varying information.

A description will now be given regarding dynamic factor prediction, in accordance with an embodiment of the present invention.

To encourage the dynamic factor $z_t$ to carry adequate and correct time-dependent information of each timestep, cheap signals from data and some off-the-shelf tool models for different types of sequential data are explored and accordingly the auxiliary tasks are designed as the regularization $\mathcal{L}_{DFP}(z_{1:T})$.

A description will now be given regarding video data, in accordance with an embodiment of the present invention.

It is desired for the content video to accurately predict the location of largest motion regions. To this end, the optical flow of video is first obtained by an off-the-shelf pretrained model FlowNet2. The optical flow map is split into nine patches by grid and compute the average of motion magnitude for every patch. The indices of patches with the top-k largest value are used as the pseudo ground-truth. In the model in accordance with the present invention, an additional branch is added on the dynamic factors, which consists of two fully-connected layers and a softmax layer for pseudo label prediction.

Apart from the optical flow, some cheap signals can be explored according to the specific type of data. For a human face dataset, the landmark of each frame can be detected and considered as a supervision for time-dependency factors. The landmark is obtained from an off-the-shelf land-mark detector. To keep the model in accordance with the present invention efficient, only the distance between the upper and lower eyelids are extracted as well as the distance between the upper and lower lips as the dynamic signal. A regression module is imposed on the $z_f$ to enforce it to predict the distances.

A description will now be given regarding audio data, in accordance with an embodiment of the present invention. For the audio dataset, an auxiliary task is designed where the time-dependency factors are forced to predicted if the speech in the current timestep silent or not. The ground truth can be readily obtained by setting a magnitude threshold on the volume of each speech clip.

A description will now be given regarding mutual information regularization, in accordance with an embodiment of the present invention.

Forcing the time-dependent factor to predict some time-varying signal can guarantee the factor includes adequate time-dependent information, but there is no guarantee that the factor exclude the static factor. Therefore, the mutual information of static and dynamic factors is introduced as a regulator $\mathcal{L}_{MI}$. The mutual information is a measure of the mutual dependence between two variables. The formal definition is the Kullback-Leibler divergence of the joint distribution to the product of marginal distribution of each variable:

$$\mathcal{L}_{MI}(z_f, z_{1:T}) = \Sigma_{t=1}^T KL(q(z_f, z_t) \| q(z_f), (z_t)) = \Sigma_{t=1}^T [f(q(z_f, z_t)) - f(q(z_f)) - \mathcal{F}(q(z_t))],$$

where $f = (q(\bullet) = \mathbb{E}_{q(z)}[\log(\bullet)] = \mathbb{E}_{q(z_f z_t)}[\log(\bullet)]$ which can be estimated by the minibatch weighted sampling estimator:

$$\mathbb{E}_{q(z)}[\log q(z_n)] \approx \frac{1}{M} \sum_{i=1}^M \left[ \log \sum_{j=1}^M q(z_n(x_i)|x_j) - \log(NM) \right] \quad (9)$$

for $z_n = z_f$, $z_t$ or $(z_f, z_t)$, where N and M are data size and minibatch size, respectively. By minimizing the mutual information of static and dynamic factors, the information in these two factors are encouraged to be mutually exclusive.

A description will now be given regarding an objective function, in accordance with an embodiment of the present invention.

Overall, an objective can be considered as the recurrent VAE loss with a series of regularization from self-supervised learning and auxiliary tasks.

$$\mathcal{L} = \mathcal{L}_{VAE} + \lambda_1 \mathcal{L}_{SCC} + \lambda_2 \mathcal{L}_{DFP} + \lambda_3 \mathcal{L}_{MI} \quad (10)$$

where $\lambda_1$, $\lambda_2$ and $\lambda_3$ are balancing factors.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for disentangled data generation, comprising:
   accessing, by a variational autoencoder, a plurality of supervision signals;
   accessing, by the variational autoencoder, a plurality of auxiliary tasks that utilize the supervision signals as reward signals to learn a disentangled representation; and
   training the variational autoencoder to disentangle a sequential data input into a time-invariant factor and a time-varying factor using a self-supervised training approach which is based on outputs of the auxiliary tasks obtained by using the supervision signals to accomplish the plurality of auxiliary tasks.

2. The computer-implemented method of claim 1, wherein the plurality of supervision signals are accessed from one or more existing supervised functional modules.

3. The computer-implemented method of claim 1, wherein the sequential data input comprises video data having a plurality of frames, and wherein the time-invariant factor is an identity of an object in the video data and the time-varying factor is a motion in each of the plurality of frames.

4. The computer-implemented method of claim 1, wherein the sequential data input comprises audio data, and wherein the time-invariant factor is an identify of a speaker and the time-varying factor is a linguistic content of the audio data.

5. The computer-implemented method of claim 1, wherein the auxiliary tasks are provided as regularization tasks for regularizing mutual information in the sequential data input relative to both the time-invariant factor and the time-varying factor, the mutual information being mutual based on an inter-factor dependency between the time-invariant factor and the time-varying factor.

6. The computer-implemented method of claim 5, further comprising minimizing the mutual information to encourage mutually exclusivity of the time-invariant factor with respect to the time-varying factor.

7. The computer-implemented method of claim 1, wherein the sequential data input comprises video data, and wherein supervision labels of the auxiliary task for regularizing the time-varying factor is provided by:
obtaining an optic flow map of the video data;
forming patches by applying a grid to the optical flow map;
computing an motion magnitude average for each of the patches; and
generating pseudo ground truths from indices of the patches with a top-k largest values as supervision labels.

8. The computer-implemented method of claim 1, wherein the sequential data input comprises audio data comprising a plurality of audio segments, and wherein supervision labels of the auxiliary task for regularizing the time-varying factor are provided by setting a magnitude threshold on a volume of each of the plurality of audio segments to obtain audio pseudo ground truths.

9. The computer-implemented method of claim 1, wherein the sequential data input comprises video data having a plurality of frames, and the method further comprises detecting a landmark in each of the plurality of frames as a supervision for the time-varying factor.

10. The computer-implemented method of claim 1, further comprising controlling a hardware device to switch from an operating state to a non-operating state responsive to any of the time-invariant factor and the time-varying factor.

11. The computer-implemented method of claim 1, further comprising generating a new training media sequence accordingly to at least one of the time-invariant factor and a time-varying factor.

12. A computer program product for disentangled data generation, the computer program product comprising a non-transitory computer readable storage medium having program instructions embodied therewith, the program instructions executable by a computer to cause the computer to perform a method comprising:
accessing, by a variational autoencoder of the computer, a plurality of supervision signals;
accessing, by the variational autoencoder, a plurality of auxiliary tasks that utilize the supervision signals as reward signals to learn a disentangled representation; and
training the variational autoencoder to disentangle a sequential data input into a time-invariant factor and a time-varying factor using a self-supervised training approach which is based on outputs of the auxiliary tasks obtained by using the supervision signals to accomplish the plurality of auxiliary tasks.

13. The computer program product of claim 12, wherein the plurality of supervision signals are accessed from one or more existing supervised functional modules.

14. The computer program product of claim 12, wherein the sequential data input comprises video data having a plurality of frames, and wherein the time-invariant factor is an identity of an object in the video data and the time-varying factor is a motion in each of the plurality of frames.

15. The computer program product of claim 12, wherein the sequential data input comprises audio data, and wherein the time-invariant factor is an identify of a speaker and the time-varying factor is a linguistic content of the audio data.

16. The computer program product of claim 12, wherein the auxiliary tasks are provided as regularization tasks for regularizing mutual information in the sequential data input relative to both the time-invariant factor and the time-varying factor, the mutual information being mutual based on an inter-factor dependency between the time-invariant factor and the time-varying factor.

17. The computer program product of claim 16, further comprising minimizing the mutual information to encourage mutually exclusivity of the time-invariant factor with respect to the time-varying factor.

18. The computer program product of claim 12, wherein the sequential data input comprises video data, and wherein supervision labels of the auxiliary task for regularizing the time-varying factor is provided by:
obtaining an optic flow map of the video data;
forming patches by applying a grid to the optical flow map;
computing an motion magnitude average for each of the patches; and
generating pseudo ground truths from indices of the patches with a top-k largest values as supervision labels.

19. The computer program product of claim 12, wherein the sequential data input comprises audio data comprising a plurality of audio segments, and wherein supervision labels of the auxiliary task for regularizing the time-varying factor are provided by setting a magnitude threshold on a volume of each of the plurality of audio segments to obtain audio pseudo ground truths.

20. A computer processing system for disentangled data generation, comprising:
a memory device for storing program code; and
a processor device operatively coupled to the memory device for running the program code to
access, using a variational autoencoder, a plurality of supervision signals;
access, using the variational autoencoder, a plurality of auxiliary tasks that utilize the supervision signals as reward signals to learn a disentangled representation; and train the variational autoencoder to disentangle a sequential data input into a time-invariant factor and a time-varying factor using a self-supervised training approach which is based on outputs of the auxiliary tasks obtained by using the supervision signals to accomplish the plurality of auxiliary tasks.

\* \* \* \* \*